(12) United States Patent
Dotan et al.

(10) Patent No.: US 9,882,879 B1
(45) Date of Patent: Jan. 30, 2018

(54) USING STEGANOGRAPHY TO PROTECT CRYPTOGRAPHIC INFORMATION ON A MOBILE DEVICE

(71) Applicant: EMC IP Holding Company LLC, Hopkinton, MA (US)

(72) Inventors: Yedidya Dotan, Newton, MA (US); Lawrence N. Friedman, Arlington, MA (US); William M. Duane, Westford, MA (US); John Brainard, Sudbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 456 days.

(21) Appl. No.: 13/928,643

(22) Filed: Jun. 27, 2013

(51) Int. Cl.
*H04L 29/06* (2006.01)

(52) U.S. Cl.
CPC .............................. *H04L 63/0428* (2013.01)

(58) Field of Classification Search
CPC ............... H04L 9/3244; H04L 2209/16; H04L 2209/34; H04L 9/065; H04L 63/0428; H04L 9/18; H04L 9/65; H04L 9/3281; H04N 21/8358; H04N 7/1675
See application file for complete search history.

(56) References Cited

U.S. PATENT DOCUMENTS

| 6,011,849 A * | 1/2000 | Orrin ..................... H04L 9/065 380/37 |
| 2005/0192904 A1* | 9/2005 | Candelore ............. H04L 9/0861 705/51 |
| 2007/0220575 A1* | 9/2007 | Cooper ................ H04N 7/1675 725/118 |
| 2008/0222734 A1* | 9/2008 | Redlich ................. G06F 21/577 726/26 |
| 2009/0210695 A1* | 8/2009 | Shahindoust ......... H04L 9/0662 713/150 |

* cited by examiner

*Primary Examiner* — Shewaye Gelagay
*Assistant Examiner* — Carlton Johnson
(74) *Attorney, Agent, or Firm* — Ryan, Mason & Lewis, LLP (57) ABSTRACT

Methods, apparatus and articles of manufacture for using steganography to protect cryptographic information on a mobile device are provided herein. A method includes querying a user to select one or more items of data stored on a computing device to be used in connection with one or more cryptographic actions associated with said computing device, and protecting one or more items of cryptographic information within the one or more selected items of data.

24 Claims, 6 Drawing Sheets

USING STEGANOGRAPHY TO PROTECT CRYPTOGRAPHIC INFORMATION ON A MOBILE DEVICE

FIELD

The field relates generally to cryptography, and more particularly to mobile data and application protection.

BACKGROUND

Protecting assets or maintaining secrets on a mobile device presents challenges. As an example, existing security approaches do not provide secure means by which to effectively generate and maintain a key on a mobile device. Additionally, passphrases and personal identification numbers (PINs) used in connection with mobile devices commonly have little to no entropy, making such security features vulnerable to attack. Accordingly, whether using security identifiers (SIDs) or securing a container in online and offline authentication, a need exists for providing capabilities to protect cryptographic information (such as a key) within data on a mobile device to decrease vulnerability to a security breach.

SUMMARY

One or more illustrative embodiments of the present invention provide techniques for using steganography to protect cryptographic information on a mobile device.

In accordance with an aspect of the invention, a method is provided comprising the steps of querying a user to select one or more items of data stored on a computing device to be used in connection with one or more cryptographic actions associated with said computing device, and protecting one or more items of cryptographic information within the one or more selected items of data.

Also, another aspect of the invention can additionally include the steps of presenting, through a user interface associated with said computing device, a collection of data stored on said computing device in connection with an authentication request to access a protected resource associated with said computing device, wherein said collection of data includes the one or more selected items of data within which the one or more items of cryptographic information are protected; and extracting the one or more items of cryptographic information protected within the one or more selected items of data, upon identification of the one or more selected items of data via the user, to grant access to the protected resource associated with said computing device.

The data protection techniques of the illustrative embodiments overcome one or more of the problems associated with the conventional techniques described previously. These and other features and advantages of the present invention will become more readily apparent from the accompanying drawings and the following detailed description.

DETAILED DESCRIPTION

As will be described, the present invention, in one or more illustrative embodiments, provides techniques for using steganography to protect cryptographic information on a mobile device.

The techniques of encoding and/or deriving cryptographic material from data files which a user selects, as described herein, provide numerous advantages over existing approaches. For example, it can be difficult for users to remember passwords of the complexity sufficient to provide meaningful security. With respect to mobile devices, for example, most mobile devices utilize a relatively weak authentication method (such as a personal identification number (PIN), selecting colors, or other short password-like mechanisms) to access a locked mobile platform.

Also, users are likely not able to remember or even record cryptographic keys of reasonable length. Accordingly, the techniques detailed herein include allowing users to select from files which the user recognizes, which are then used to derive or recover cryptographic values which are strong. Again with respect to mobile devices, for example, most mobile devices act as a portable file store, and many of the files are personal to the mobile device owner or are easily recognizable by the mobile device owner.

In addition, the techniques described herein include creating difficulty for an attacker to detect which files the user has selected, and one or more embodiments of the invention further allow for alarms to be raised or the security posture of the system to be altered upon attempts to log-in using incorrect information. Further, it is good cryptographic practice to periodically change key material and/or passwords. With the techniques described herein, such cryptographic keys or values can be changed as often as needed, without forcing the user to change the files that he or she selects to access the system or data. Conversely, the user can change the files that he or she selects, and the system can adjust so that this change does not force the system as a whole to update the cryptographic keys or passwords at the same time.

Illustrative embodiments of the present invention will be described herein with reference to exemplary communication systems and associated processing devices. It is to be appreciated, however, that the invention is not restricted to use with the particular illustrative system and device configurations shown.

Accordingly, a communication system or a computing device, as detailed herein, is intended to be broadly construed so as to encompass any type of system in which multiple processing devices can communicate with one another and/or any type of processing device that incorporates cryptographic functionality (such as a computer, server, mobile device, radio-frequency identification (RFID) tag or reader, authentication token, etc.).

Also, cryptographic information, as used herein, is intended to include passwords, passcodes, answers to life questions, or other authentication credentials, or values derived from such authentication credentials, or more generally any other information that a user may be required to submit in order to obtain access to an access-controlled application such as a key. As described herein, in accordance with at least one embodiment of the invention, cryptographic information includes a key stored and/or protected within data (for example, user-related data) selected from local memory on a user mobile device. By way of further example, such a cryptographic key can be used for encryption, decryption, hash-based message authentication code (HMAC) operations, and/or signature operations.

Figure 1:
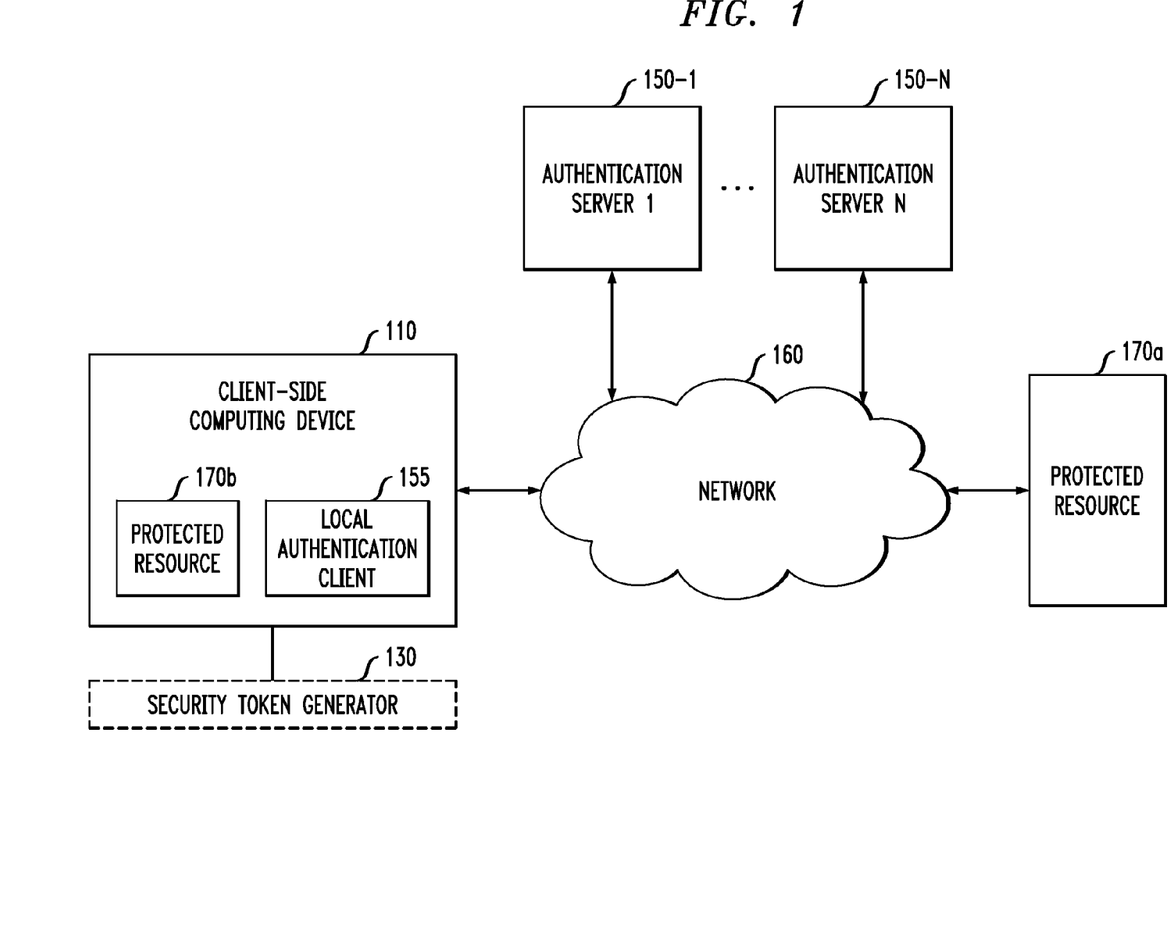
FIG. 1 is a diagram illustrating an example network environment in which one or more embodiments of the present invention can operate.

FIG. 1 illustrates an example environment wherein a client-side computing device (CSCD) 110 communicating with a protected resource 170a over a network 160. As detailed further below, at least one embodiment of the invention can also include a CSCD 110 that includes a protected resource 170b residing thereon. In general implementations, a user must authenticate with one or a plurality of authentication servers 150-1 through 150-N (hereinafter, collectively referred to as authentication servers 150) using a token generated by a security token generator 130 (hereinafter, referred to as security token 130) before obtaining access to protected resource 170a and/or 170b (hereinafter, collectively referred to as protected resource 170 unless otherwise specified). As used, herein, an authentication server refers to any type of processing device or set of such devices that is operative to authenticate an item of cryptographic information provided by an authentication token or other type of computing device. An authentication server need not be a network-based server, and may be implemented as a portion of a device that performs other functions, as a combination of multiple servers or other devices, or in other forms.

Additionally, as depicted in FIG. 1, at least one embodiment of the invention can also include a CSCD 110 that includes a local authentication client 155 residing thereon, wherein such an authentication client 155 is operative to authenticate an item or items of cryptographic information provided, for example, by a user of the CSCD device through an interface. Such an embodiment of the invention is described in further detail herein.

As indicated above, in at least one example embodiment of the invention described herein, a CSCD 110 can encompass a mobile device such as a mobile phone, a smart phone, a tablet, etc. Additionally, as depicted in FIG. 1, the network 160, may comprise, for example, a global computer network such as the Internet, a wide area network (WAN), a local area network (LAN), a satellite network, a telephone or cable network, or various portions or combinations of these and other types of networks.

It is to be appreciated that a given embodiment of the disclosed system may include multiple instances of protected resource 170, and possibly other system components, although the depicted instances of such components are shown in the simplified system diagram of FIG. 1 for clarity of illustration.

The security token 130 is shown in FIG. 1 as being separate from and electrically connected to the CSCD 110. The security token 130 may be a server or other type of module that is accessible over the network 160, or it may be a software component resident on the CSCD 110.

As noted, the CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of cryptographic techniques in accordance with the invention.

The CSCD 110 may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other cryptographic information described as being associated with a user may, for example, be associated with a CSCD device 110, a person utilizing or otherwise associated with the device, or a combination of both the person and the device.

Further, the protected resource 170 may be, for example, an access-controlled application, resident software program, web site or hardware device. In other words, a protected resource 170 is a resource that grants user access responsive to an authentication process, as will be described in greater detail below. For example, protected resource 170a may include an access controlled file, e-mail, a protected application, a remote application server such as a web site or other software program or hardware device that is accessed by the CSCD 110 over a network 160.

Additionally, in at least one embodiment of the invention, protected resource 170b can include one or more applications or data residing on the CSCD 110 itself. For example, such a protected resource 170b can include access to a mobile data management container for launching applications on the CSCD 110 (such as a mobile device), which can be protected requiring a successful authentication in order to run the application(s) protected by the container. Further, protected resource 170b could also include an access controlled file, e-mail, a protected application, or other software program accessed within the CSCD 110. Similarly, it is possible that in order to unlock the mobile platform to perform operations, a successful authentication would be required.

As described herein, at least one invention includes identifying data resident on a mobile device within which to place and/or protect cryptographic information (such as a key). By way of example, the size of such cryptographic information can range between one and hundreds of kilobytes (KB), and many mobile devices commonly contain multi-megabyte (MB) files (or even multi-gigabyte (GB) files) such as applications, videos, audio files (such as songs) and pictures.

Figure 2:
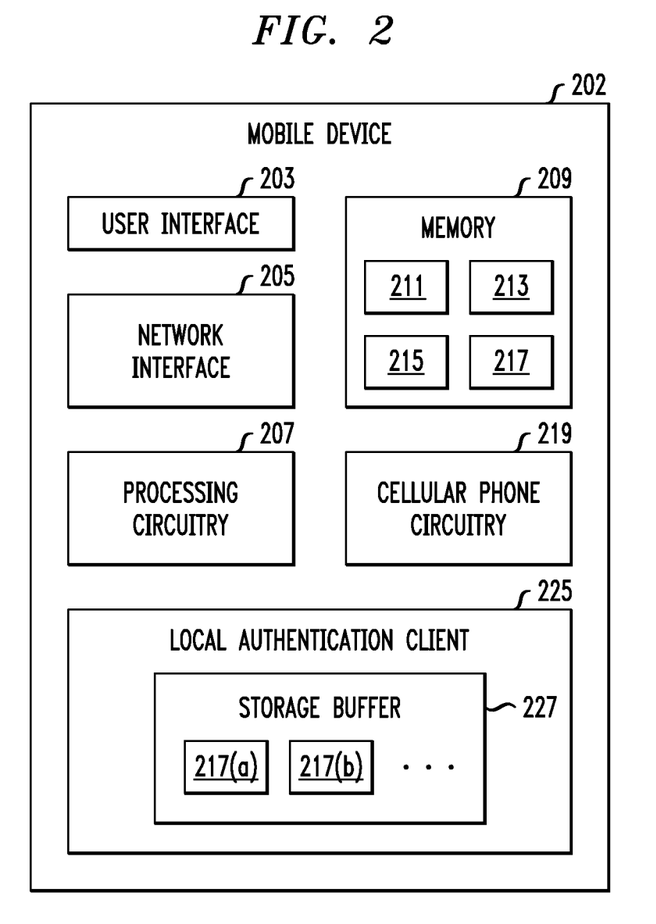
FIG. 2 is a system diagram of an exemplary mobile device on which at least one embodiment of the invention can be implemented.

FIG. 2 is a system diagram of an exemplary mobile device 202 on which at least one embodiment of the invention can be implemented. By way of illustration, FIG. 2 depicts a network interface 205 of the mobile device 202 configured to connect the mobile device 202 to a communications medium such as, for example, Wi-Fi and/or cellular telephony. Accordingly, the network interface 205 enables the mobile device 202 to communicate with the other components of an electronic environment. Additionally, the mobile device 202 includes a user interface 203 configured to receive user input and provide user output, such as a data file and/or data file location selection(s), such as described herein. One or more embodiments of the invention can include components such as a display screen, a capacitive touch display, and a push-button keyboard implemented for use in connection with the user interface 203.

Additionally, for completeness, cellular phone circuitry 219 within mobile device 202 allows the user to establish cellular phone calls with other callers having remote devices, as would be appreciated by one skilled in the art.

The memory 209 of mobile device 202 is configured to store one or more software constructs including, for example, an operating system 211, an authentication application 213, data for protected resources 215 (documents, restricted applications, etc.), a cryptographic information file 217, as well as other suitable or relevant material. Further, the processing circuitry 207 of mobile device 202 is configured to operate in accordance with the software constructs stored in the memory 209. By way of example, when the processing circuitry 207 runs the operating system 211, the processing circuitry 207 provides a secure electronic platform on which a user is able to carry out work. Such an electronic platform is capable of operating, for example, as a container to protect data and requiring user authentication before permitting access. Further, when the processing circuitry 207 runs the authentication application 213, the processing circuitry 207 communicates with the local authentication client 225 in a secure manner, for example, to obtain cryptographic information 217(a), 217(b), etc. from storage buffer 227, as additionally described herein. It should be appreciated that the processing circuitry 207 can include one or more processors running specialized software, such as detailed in connection with the techniques detailed herein.

In at least one embodiment of the invention, once the mobile device 202 is able to obtain valid cryptographic information 217(a), 217(b), etc. (for example, via selection by a user of the mobile device 202), the user of the mobile device 202 is able to perform local user authentication to access protected resources. Accordingly, as noted, the mobile device 202 is provisioned with the authentication application 213 and cryptographic information file 217 holding pre-determined cryptographic information (such as, for example, a known template with a bit or a header corresponding thereto). For example, and as further detailed in connection with FIG. 3, such cryptographic information can include a key. As described herein, such data can take the form of picture or image files, music or audio files, video files, etc.

Additionally, in an example, embodiment of the invention, mobile device 202 is provisioned with the authentication application 213. At some earlier provisioning step, the user selected a file (such as file 217), which the user would subsequently recognize and recall when an authentication was needed and/or required. Examples of file 217 can include one or more pictures, one or more music files, one or more applications, etc. Further, in this example embodiment, file 217 is provisioned with security information (such as a key), which is encoded into file 217 in such a way that encoding the security information does not prevent the file from being used for its normal purpose. Also, the encoding of the security information into file 217 is done in such a way that an attacker examining file 217 would not easily be able to detect the presence of the security information or easily extract that security information. At some later point in time, when an authentication is needed and/or required, the user will indicate which file (217) he or she had previously chosen within which to hold and/or protect the security information. Subsequently, the embedded security information would be decoded from the selected file and would be available for use in the authentication.

In an alternative embodiment of the invention, instead of encoding security information into the file (217), the file (217) can be used, for example, to derive the security information without modifying the file. For example, if the file is an audio recording, there would generally be some small level of noise present in the background of the file. This noise can have enough randomness such that extracting the bits of data associated with the noise could create a key with sufficient entropy to serve a variety of cryptographic operations (such as authentication, encryption, digital signatures, etc.). In such an embodiment, the user would select some file which he or she would subsequently recognize, the application would examine the file to determine if the file met the security requirements (such as, for example, having enough randomness to create a key), and if so, extract the key from the data in the file. The key could then be used in a cryptographic operation, such as encrypting data. Subsequently, upon a desire to decrypt the data, the user would identify the same file which was used to derive the encryption key, the key would be re-extracted, and the data decrypted.

Consequently, the processing circuitry 207 of the mobile device 202 can perform a local cryptographic operation using cryptographic information 217 stored in the memory 209. In at least one embodiment of the invention, for example, the processing circuitry 207 runs the authentication application 213, which directs the user of the mobile device 202, via the user interface 203, to select and/or identify cryptographic information 217(a), 217(b), etc., which includes one or more data files resident on the mobile device (for example, stored via element 215) and possibly a location or sub-component of the one or more data files within which the user believes cryptographic information (such as a key) matching the pre-determined information stored in file 217 is protected. In response to the input of this cryptographic information 217(a), 217(b), etc. (which is temporarily stored in the storage buffer 227 of the local authentication client 225 during this processing), the authentication application 213 compares the user-provided cryptographic information 217(a), 217(b), etc. with one or more appropriate expected items of cryptographic information from file 217. Additionally, at least one embodiment of the invention can include using the user-provided cryptographic information 217(a), 217(b), etc. to decrypt and integrity-check a protected resource.

If a match is determined in this comparison, the cryptographic information is extracted from components 217(a), 217(b), etc., for example, via reading the relevant bit or header (from the selected information 217(a), 217(b), etc.) based on the known template (such as stored in file 217). Subsequently, the authentication application 213 permits the user to access a protected resource (such as, for example, data in association with element 215 that is stored in the memory 209).

In addition to the above-noted embodiment, in one example embodiment of the invention, a key derived from an existing unmodified file replaces the password or other similar cryptographic value already used for device authentication. This type of embodiment can be implemented wherein the user can select the password or key to be used for the authentication.

Also, in an alternate embodiment, the password and/or key used for authentication may be provided to the user by some administrator. Therefore, the password and/or key from an unmodified file cannot be directly used. In this instance, the provided password and/or key would be encoded into the selected file on the mobile device, and to authenticate, the user would select the same file, and the password and/or key provided by the administrator would be recovered and then used.

In yet another example embodiment of the invention, a combination of the two above-noted embodiments can be implemented. Accordingly, a file can be selected, and a key can be derived from that file without modifying the file. This extracted key could then be used to encrypt an administrator-provided password and/or key, yielding an encrypted authentication value. Subsequently, when the user needed to authenticate, he or she would select the appropriate file, and the decryption key would be recovered and used to decrypt the administrator-provided password and/or key, which could then be used to perform the login.

Figure 3:
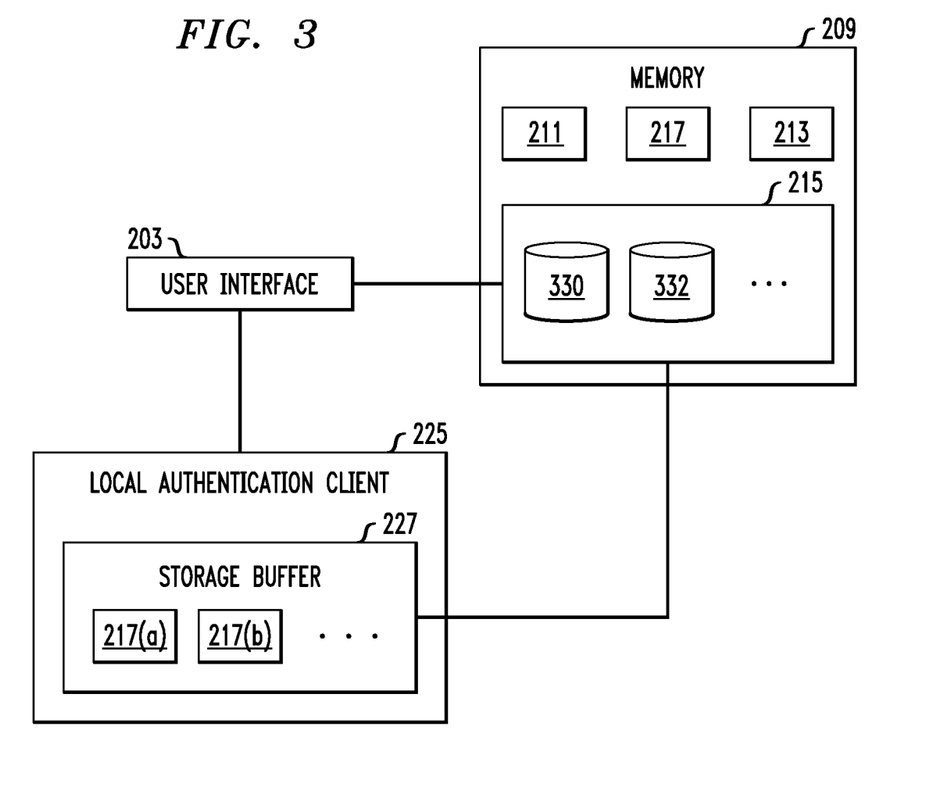
FIG. 3 is a system diagram of exemplary mobile device components, in accordance with at least one embodiment of the invention.

FIG. 3 is a system diagram of exemplary mobile device components, in accordance with at least one embodiment of the invention. As depicted in FIG. 3, a user can select one or more files (for instance, one or more files easily recognizable to the user) within which to protect cryptographic information such as a key. The one or more files are selected from resources stored in element 215 in memory 209 (on mobile device 202, such as depicted in FIG. 2), and such a selection can be carried out via a graphical user interface 203 on the mobile device.

More specifically, as depicted in FIG. 3, the one or more files are selected from databases within element 215, such as an image database 330, audio files database 332, etc. As detailed herein, additional databases might include an applications database and a video files database. Accordingly, a user, via user interface 203, selects one or more files from database 330 and/or database 332 within which to protect cryptographic information 217 (such as a key, for example). For example, the user may select a song file or a photograph file within which to protect a key which is to be used in connection with one or more specific cryptographic tasks.

Consequently, a corresponding cryptographic flow (carried out, for example, by authentication application 213 as run by operating system 211) can take the following exemplary form. The user is prompted (via user interface 203) to authenticate in connection with an authentication request to access a protected resource associated with the mobile device (for example, the user wishes to access and/or unlock his or her smart phone). The user is prompted to select a file or a number of files from a collection of files (such as databases 330, 332, etc.) or a list of files presented via the user interface 203. Subsequently, if the user correctly selects or identifies the file(s) within which the one or more items of cryptographic information are protected, the cryptographic information is extracted from the selected file(s) and the user is granted access to the protected resource in question.

In at least one embodiment of the invention, in connection with an authentication request to access a protected resource, the user (via user interface 203) selects files 217(a), 217(b), etc. from databases 330, 332, etc., and the selected files are temporarily stored in the storage buffer 227 of the local authentication client 225. It should be noted that, in accordance with one or more embodiments of the invention, databases 330, 332, etc. are not restricted to particular systems (such as, for example, relational database management system (RDBMS) systems).

Additionally, the authentication application 213 compares the selected files 217(a), 217(b), etc. with the pre-selected/expected cryptographic information in element 217 to determine if a match exists. Accordingly, if the selected files (217(a), 217(b), etc.) (as well as, in at least one embodiment of the invention, one or more specific locations additionally identified by the user during the selection process) contain the protected cryptographic information that matches the cryptographic information stored in element 217, the cryptographic information is extracted from the selected files and the user is successfully authenticated.

Alternatively, at least one embodiment of the invention includes implementations wherein there is no copy of the pre-selected/expected cryptographic information maintained. For example, if a key extracted from, or encoded into, the selected file is used to encrypt an element needed to log-in to a system, that key can be destroyed after the encryption occurs (for example, at log-out). Subsequently, when the user attempts to log-in, he or she is stopped because the element is still encrypted. The user must then select the proper file in order to recover the key to decrypt the element, allowing the log-in to proceed. In such an embodiment, no copy of the recovered key is maintained between log-in and log-out, thereby reducing vulnerability to a security breach.

The protected cryptographic information can additionally be used, for example, as a cryptographic key for confidentiality or integrity algorithms, or combined confidentiality-integrity algorithms. Also, the protected cryptographic information can be used as input to a further key-derivation algorithm, as well as used as the seed to generate further cryptographic values.

Further, at least one embodiment of the invention includes the use of cryptographic salt and/or cryptographic pepper. As used herein, salt is a random value known to the system, whereas pepper is a random value which is used and then destroyed. As a result, during the recovery operation, the salt will be known to the system, but the pepper will need to be determined by performing a brute force search of all possible pepper values until the correct pepper value is located. Using salt during the operation to encode and/or recover security information into a file can, for example, make it difficult for an attacker to recover the security information via some pre-computed dictionary or rainbow table style of attack. A benefit of using pepper is that the additional brute force needed will slow down the authentication of the user who selects the proper file by some amount, but this effect is multiplied for the attacker because the attacker does not know which file is correct, and must perform the brute force pepper recovery on all attempted files. In some cases, the use of pepper can make the attacker's progress so slow as to make the attack unfeasible.

Accordingly, at least one embodiment of the invention includes the storage of a value or values which further modify and enhance the security of a solution. The value(s) can be stored in the header of the selected file, or in some other known location. The value(s) can be used to choose from a set of patterns which indicate the locations where the bits of the hidden authentication reside in the file. The value(s) can also choose which encoding algorithm (for example, from a set of algorithms) is used to encode the hidden authentication data. The value(s) can additionally choose which cryptographic algorithm (for example, from a set of algorithms) is used with the hidden authentication data. Those skilled in the art will recognize that there are a number of ways that the value(s) can modify the encoding of, or use of, the hidden data.

Note that one example embodiment of the invention includes encoding the value(s) into the selected file(s) in such a way that recovery of the value(s) instructs the application in the recovery of, or use of, the hidden authentication data. One example can include wherein the user selects two files through the user interface. The first file can store the value(s), and the second file can store the encoded authentication data in the manner indicated by the value(s) stored in the first file.

Further, by way of example, in an audio file or a video file (a song, a movie, etc.), the user can select not only the specific file(s) within which to protect cryptographic information, but can also select a particular location or locations within the selected file(s) at which to protect the cryptographic information. Similar location selections can be carried out in other types of files, such as, for example, selecting a section in a picture file at which to place and/or protect a piece of cryptographic information such as a key.

Many user mobile devices (such as smart phones) commonly contain between 100-5000 data files. As such, adding an additional layer of entropy in the form of identifying one or more specific locations within one or more of these many data files significantly decreases the device's vulnerability to a security breach. Further, one or more embodiments of the invention can include adding and/or incorporating additional data files (also referred to herein as chaff) to a given mobile device to increase entropy.

Accordingly, as noted, adding additional files (for example, random picture files or random music files) can be one way to add chaff. Alternative, in addition to modifying the chosen files to contain the hidden authentication data, at least one embodiment of the invention can also include randomly selecting a number of other similar files (other pictures or other music files, etc.) specifically not selected by the user, and modifying these other similar files in the same way with hidden authentication data. In these chaff files, the authentication data stored in the files is not the actual authentication data, but rather, includes random values which mimic valid authentication data. As such, if an attacker determines some way to detect which files have been encoded with hidden authentication data, the attacker will not know which file contains the valid authentication data.

Further, in at least one embodiment of the invention, the chaff files which were modified, as described above, can be encoded not with random authentication data but with special authentication data which could be recognized by the system (for example, log-in credentials to a special account). An attacker may be attracted to these files (also referred to as "honey files") because the files have had modifications done to them in the same way that the valid file was modified. However, when the attacker attempts to log-in using a honey file, the action will be recognized as an attack, and appropriate measures can be taken. Such measures can include, for example, locking-out the system for some period of time, sending a text or email message to the user's email account or an administrator account with a warning message, generating an event for a security Information and Event Management (SIEM) system, etc.

Additionally, at least one embodiment of the invention includes querying the user to replace the selected file(s) and/or location(s) therein at a given interval. Also, as noted herein, a user can select multiple files and/or multiple locations therein to protect multiple items of cryptographic information and/or multiple sub-components of a single piece of cryptographic information. Such an embodiment of the invention can additionally include providing the capabilities for the user to select the multiple files and/or multiple locations therein in a specific sequence, such that the specific sequence would need to be repeated to successfully complete the cryptographic process.

As noted herein, at least one embodiment of the invention can include implementation so as to protect cryptographic information such as a key in one or more data files resident on a mobile device. Such a key can, for example, be used to encrypt or lock a mobile device management (MDM) container, thereby serving to further protect data and/or wrap applications that contain credentials. Additionally, such a key (or other piece of cryptographic information) can, for example, be used to unlock or decrypt a container of additional keys. Also, keys in such a container of keys can be used for encryption or integrity-protection of sensitive data files stored on the device. By way of example, consider a scenario wherein a user attempts to access an application that is controlled by an MDM, such as email, that includes both online and offline data. Accordingly, in such a scenario, the user is challenged to generate a key to access his or her email.

Also, at least one embodiment of the invention includes incorporating a biometrics component. By way of example, cryptographic information protected within in one or more selected data files resident on a mobile device in connection with an example embodiment of the invention can be utilized to unlock a biometric template, to be further used in a biometric authentication process to access a protected resource.

At least one embodiment of the invention can additionally include incorporating geographic location parameters (such as, for example global positioning system (GPS) coordinates) as well as other sensor data in connection with a mobile device. Other sensor data can include, for example, data derived from accelerometers, data pertaining to the presence of other wireless or mobile devices, as well as quick response (QR) code. In such an embodiment, the additional information can be encoded directly into the file(s) selected by the user, or stored separately as encrypted data, protected by a key which has been encoded into the file selected by the user.

Geographic location information (which can serve as salt in one or more embodiments of the invention), by way of example, can be utilized as an authentication parameter in addition to the cryptographic information protected in the selected data file(s). For instance, in such an embodiment, upon being presented with an authentication prompt, a user would need to select the correct data file or files as well as, possibly, the correct location(s) therein to identify the protected cryptographic information. Additionally, the user would also need to be operating his or her mobile device from geographic coordinates that matched the pre-determined coordinates identified from successful completion of the authentication process. Also, in such an embodiment, the additional information can be encoded directly into the file(s) selected by the user, or stored separately as encrypted data, protected by a key which has been encoded into the file selected by the user.

Figure 4:
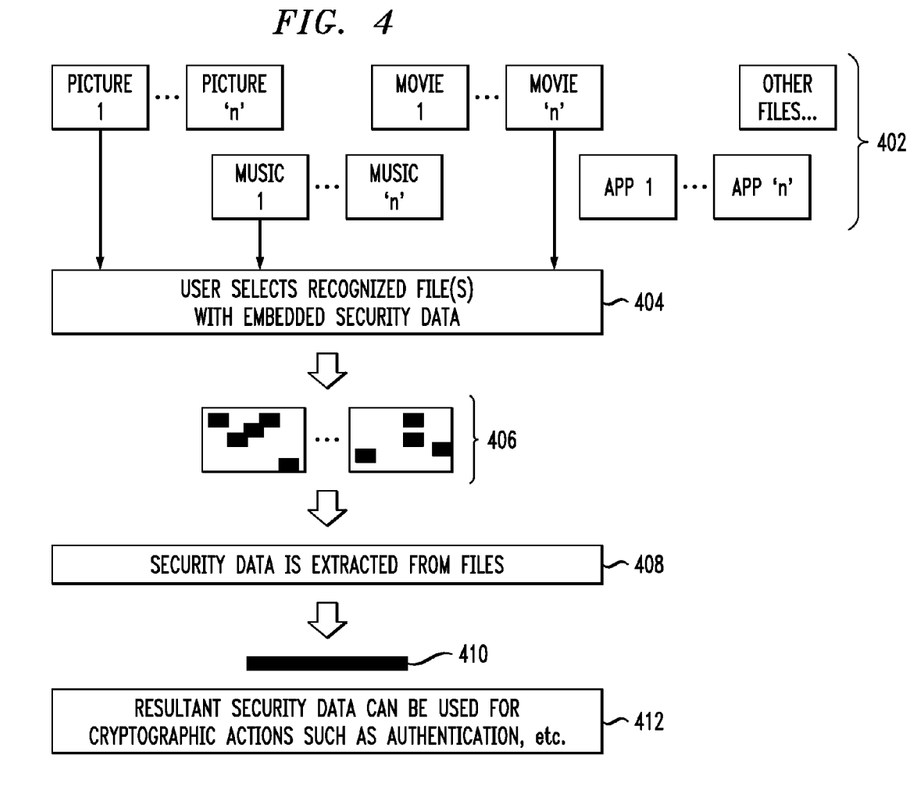
FIG. 4 is a diagram illustrating techniques according to an embodiment of the present invention.

FIG. 4 is a diagram illustrating techniques according to an embodiment of the present invention. By way of illustration, FIG. 4 depicts files 402 resident on a mobile device (for example, all files resident on the mobile device). As detailed herein, such files 402 can include picture files, music files, movie files, application files, etc. In step 404, the user (of the mobile device) selects files 406 (from the set of files 402) that are recognized and contain embedded security data and/or cryptographic information. In step 408, the security data and/or cryptographic information 410 is extracted from the selected files 406, and the resultant security data and/or cryptographic information 410 can be used for cryptographic actions (such as authentication, etc.) in step 412, such as described herein.

Figure 5:
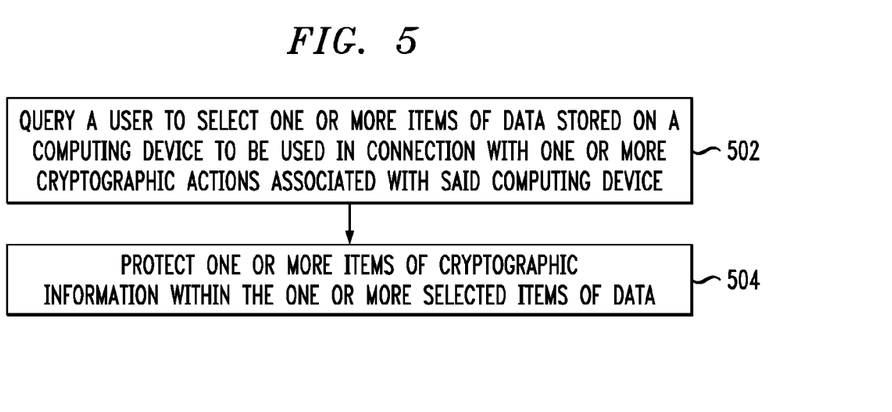
FIG. 5 is a flow diagram illustrating techniques according to an embodiment of the present invention.

FIG. 5 is a flow diagram illustrating techniques according to an embodiment of the present invention. Step 502 includes querying a user to select one or more items of data stored on a computing device to be used in connection with one or more cryptographic actions associated with said computing device (for example, a mobile device). The items of data, as detailed herein, can include one or more image data files, one or more audio data files, one or more video data files, one or more application data files, etc.

By way of example, cryptographic actions can include authentication actions, encryption actions, and/or decryption actions. Similarly, cryptographic information can include, for example, authentication information, a digital signature, and/or a cryptographic hash.

The querying step can include querying a user via a user interface associated with said computing device. Additionally, in at least one embodiment of the invention, the user can be queried to select multiple items of data in a specific sequence.

Step 504 includes protecting one or more items of cryptographic information within the one or more selected items of data. By way merely of example, the cryptographic information, as detailed herein, can include a key. In at least one embodiment of the invention, such a key can include a key used to encrypt a mobile device management container, and/or a key used to decrypt a container of one or more additional keys. Additionally, the cryptographic information can include an item of cryptographic information used to unlock a biometric template for use in a biometric authentication process.

Additionally, at described herein, at least one embodiment of the invention can include deriving one or more items of cryptographic information within the one or more selected items of data. In such an embodiment, for example, the one or more selected items of data are used to create cryptographic information (such as a key).

The techniques depicted in FIG. 5 can also include querying the user to identify a particular portion of each of the one or more selected items of data within which the one or more items of cryptographic information are to be protected. Also, at least one embodiment of the invention can include storing one or more additional data files on the computing device, as well as querying the user to re-select the one or more selected items of data at a given interval.

Figure 6:
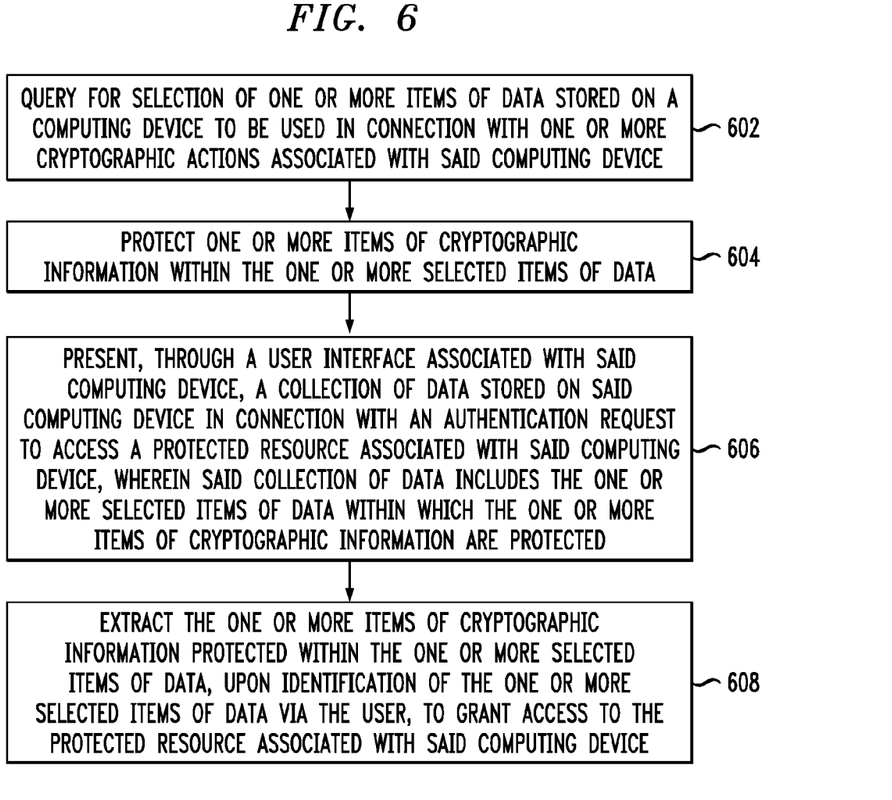
FIG. 6 is a flow diagram illustrating techniques according to an embodiment of the present invention.

FIG. 6 is a flow diagram illustrating techniques according to an embodiment of the invention. Step 602 includes querying for selection of one or more items of data stored on a computing device to be used in connection with one or more cryptographic actions associated with said computing device. Step 604 includes protecting one or more items of cryptographic information within the one or more selected items of data.

Step 606 includes presenting, through a user interface associated with said computing device, a collection of data stored on said computing device in connection with an authentication request to access a protected resource associated with said computing device, wherein said collection of data includes the one or more selected items of data within which the one or more items of cryptographic information are protected. Step 608 includes extracting the one or more items of cryptographic information protected within the one or more selected items of data, upon identification of the one or more selected items of data via the user, to grant access to the protected resource associated with said computing device.

As would be appreciated by one skilled in the art, extracting the one or more items of cryptographic information can be carried out via multiple processes. For instance, an example embodiment of the invention can include embedding a key in every five bits for a given length of pixel. Additionally, an example embodiment can include placing a key in a noise section in a conformed or identifiable configuration. Accordingly, in these as well as other possible example embodiments of the invention, the techniques include reading a relevant bit or a relevant header based on a known template. Additionally, an item of data in which a key is embedded can be said to obey a particular probability distribution. There are many possible distributions, such as an example of "every fifth pixel," as well as example algorithmic encodings with error-correcting codes. In each example, an algorithm knows the probability distribution, and therefore, knows how to extract the key.

In files which contain digital representations of analog information (for example, pictures, video recording, audio recordings, music files, etc.), there is an element of noise contained within the digital representation of the analog data. For instance, depending upon how the analog data is encoded into digital form, it may be that the low order bit of every byte represents this low magnitude noise. In a picture, this noise may show up as random faint speckling of the picture, or, in an audio recording, this noise may show up as random faint background hiss. Accordingly, an example embodiment of the invention includes changing such low order bits to hold the bits which, when combined, yield the hidden authentication data (for example, a key). Because a good cryptographic key is a random value, and the bits being modified are random noise, the result is that the modifications will not be apparent in the resultant file, nor will a statistical analysis yield the presence of these bits.

Similarly, because this noise is random in nature, instead of replacing these bits with the bits of a pre-determined key, at least one embodiment of the invention includes selecting a specific set of these already random bits to yield a key which can be used for cryptographic purposes. In this way, no modification to the file is made, making it difficult for an attacker to know which file among many was used to create the key. One skilled in the art will realize that many additional encodings of analog data exist, and hence, encoding or extraction of keys in these files may differ from the above-described process.

The techniques depicted in FIG. 6 can also include incorporating a geographic location parameter associated with said computing device as an authentication parameter to grant access to the protected resource. Also, at least one embodiment of the invention includes querying the user to identify a particular portion of each of the one or more selected items of data within which the one or more items of cryptographic information are to be stored and/or protected. Such an embodiment of the invention further includes extracting the one or more items of cryptographic information protected within the one or more selected items of data, upon identification of the one or more selected items of data and each corresponding particular portion of the one or more selected items of data via the user, to grant access to the protected resource associated with said computing device.

Additionally, in at least one embodiment of the invention, the user can take a picture of some object at a first location (say, for example, a coffee cup in his or her office), and that file can be encoded with the geographic location information pertaining to where the picture was taken, as well as the hidden cryptographic data. Alternatively, the hidden cryptographic data can be in a separate file protected by the key hidden in the data. At a second location, the user could take a picture of another object (say, for example, the coffee cup that he or she uses at home), and that file can be encoded with the geographic location information pertaining to this second location, along with the hidden cryptographic data. The hidden data—for example, a log-in password—could be the same in each instance. As such, in order to log-in, the user would need to select the proper image (that is, the office coffee cup or the home coffee cup) associated with where the location from which he is she is logging-in.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 7:
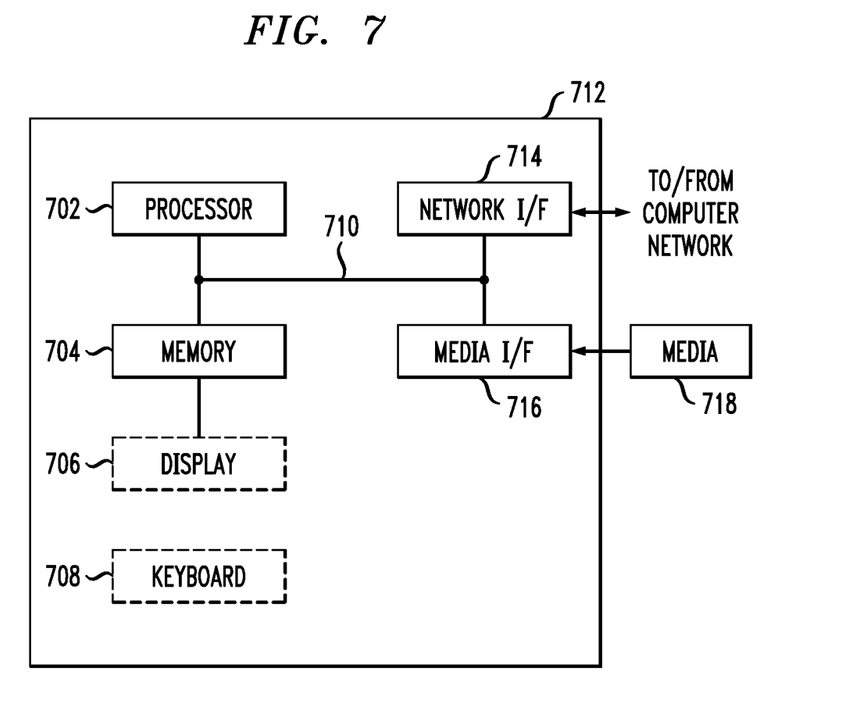
FIG. 7 is a system diagram of an exemplary computer system and/or client-side computing device on which at least one embodiment of the invention can be implemented.

By way of example, an aspect of the present invention can make use of software running on a general purpose computer. As noted above, FIG. 7 is a system diagram of an exemplary computer system on which at least one embodiment of the invention can be implemented. As depicted in FIG. 7, an example implementation employs, for example, a processor 702, a memory 704, and an input/output interface formed, for example, by a display 706 and a keyboard 708. The term "processor" as used herein includes any processing device(s), such as, for example, one that includes a central processing unit (CPU) and/or other forms of processing circuitry. Additionally, the processor 702 as shown may be viewed as representing, for example, CSCD 110, security token generator 130, authentication servers 150 and protected resource 170. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 702, memory 704, and input/output interface such as display 706 and keyboard 708 can be interconnected, for example, via bus 710 as part of a data processing unit 712. Suitable interconnections via bus 710, can also be provided to a network interface 714 (such as a network card), which can be provided to interface with a computer network, and to a media interface 716 (such as a diskette or compact disc read-only memory (CD-ROM) drive), which can be provided to interface with media 718.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 708, displays 706, and pointing devices, can be coupled to the system either directly (such as via bus 710) or through intervening I/O controllers.

Network adapters such as network interface 714 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 712 as depicted in FIG. 7) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and computing devices that can benefit from using steganography in key generation. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:

querying a user to select, in a user-determined ordered sequence, multiple items of multimedia data stored on a computing device to be used in connection with one or more cryptographic actions associated with said computing device, wherein said computing device comprises a mobile device;

protecting respective ones of multiple sub-components of an item of cryptographic information within respective ones of the multiple selected items of multimedia data such that each of the multiple selected items of multimedia data protects at least one of the multiple sub-components of the item of cryptographic information, and wherein said protecting comprises (i) encoding and storing, into at least a first of the multiple selected items of multimedia data, one or more values, and (ii) encoding and storing, into at least a second of the multiple selected items of multimedia data, authentication data in a manner indicated by the one or more values stored in the at least a first of the multiple selected items of multimedia data;

presenting, through a user interface associated with said computing device, a collection of multimedia data stored on said computing device in connection with an authentication request to access a protected resource associated with said computing device, wherein said collection of multimedia data includes (i) the respective ones of the multiple selected items of multimedia data within which the respective ones of the multiple sub-components of the item of cryptographic information are protected and (ii) one or more additional items of multimedia data encoded with authentication data recognized by the computing device as log-in credentials to an account associated with an attempted attack on the computing device;

extracting each of the respective ones of the multiple sub-components of the item of cryptographic information protected within the respective ones of the multiple selected items of multimedia data, upon user identification of the respective ones of the multiple selected items of multimedia data, in the user-determined ordered sequence, to grant access to the protected resource associated with said computing device; and performing the one or more cryptographic actions using the protected resource;

wherein said querying, said protecting, said presenting, said extracting, and said performing are carried out by at least one computer device.

2. The method of claim 1, wherein said one or more cryptographic actions comprises one or more authentication actions.

3. The method of claim 1, wherein said one or more cryptographic actions comprises one or more encryption actions.

4. The method of claim 1, wherein said one or more cryptographic actions comprises one or more decryption actions.

5. The method of claim 1, wherein said item of cryptographic information comprises an item of authentication information.

6. The method of claim 1, wherein said item of cryptographic information comprises a digital signature.

7. The method of claim 1, wherein said item of cryptographic information comprises a cryptographic hash.

8. The method of claim 1, wherein said querying comprises querying a user via a user interface associated with said computing device.

9. The method of claim 1, wherein said multiple items of multimedia data stored on a computing device comprise at least one or more image data files.

10. The method of claim 1, wherein said multiple items of multimedia data stored on a computing device comprise at least one or more audio data files.

11. The method of claim 1, wherein said multiple items of multimedia data stored on a computing device comprise at least one or more video data files.

12. The method of claim 1, wherein said multiple items of multimedia data stored on a computing device comprise at least one or more application data files.

13. The method of claim 1, wherein said item of cryptographic information comprise a key.

14. The method of claim 13, wherein said key comprises a key used to encrypt a mobile device management container.

15. The method of claim 13, wherein said key comprises a key used to decrypt a container of one or more additional keys.

16. The method of claim 1, further comprising:
querying the user to identify a particular portion of each respective one of the multiple selected items of multimedia data within which respective ones of the multiple sub-components of the item of cryptographic information are to be protected.

17. The method of claim 1, further comprising:
querying the user to re-select, at a given interval, multiple items of multimedia data stored on said computing device to be used in connection with one or more cryptographic actions associated with said computing device.

18. The method of claim 1, wherein said item of cryptographic information comprises an item of cryptographic information used to unlock a biometric template for use in a biometric authentication process.

19. An article of manufacture comprising a non-transitory processor-readable storage medium having processor-readable instructions tangibly embodied thereon which, when implemented, cause a processor to carry out steps comprising:

querying a user to select, in a user-determined ordered sequence, multiple items of multimedia data stored on a computing device to be used in connection with one or more cryptographic actions associated with said computing device, wherein said computing device comprises a mobile device;

protecting respective ones of multiple sub-components of an item of cryptographic information within respective ones of the multiple selected items of multimedia data such that each of the multiple selected items of multimedia data protects at least one of the multiple sub-components of the item of cryptographic information, and wherein said protecting comprises (i) encoding and storing, into at least a first of the multiple selected items of multimedia data, one or more values, and (ii) encoding and storing, into at least a second of the multiple selected items of multimedia data, authentication data in a manner indicated by the one or more values stored in the at least a first of the multiple selected items of multimedia data;

presenting, through a user interface associated with said computing device, a collection of multimedia data stored on said computing device in connection with an authentication request to access a protected resource associated with said computing device, wherein said collection of multimedia data includes (i) the respective ones of the multiple selected items of multimedia data within which the respective ones of the multiple sub-components of the item of cryptographic information are protected and (ii) one or more additional items of multimedia data encoded with authentication data recognized by the computing device as log-in credentials to an account associated with an attempted attack on the computing device;

extracting each of the respective ones of the multiple sub-components of the item of cryptographic information protected within the respective ones of the multiple selected items of multimedia data, upon user identification of the respective ones of the multiple selected items of multimedia data, in the user-determined ordered sequence, to grant access to the protected resource associated with said computing device; and performing the one or more cryptographic actions using the protected resource.

20. An apparatus comprising:
a memory; and
at least one processor coupled to the memory and configured to:
query a user to select, in a user-determined ordered sequence, multiple items of multimedia data stored on a computing device to be used in connection with one or more cryptographic actions associated with said computing device, wherein said computing device comprises a mobile device;
protect respective ones of multiple sub-components of an item of cryptographic information within respective ones of the multiple selected items of multimedia data such that each of the multiple selected items of multimedia data protects at least one of the multiple subcomponents of the item of cryptographic information, and wherein said protecting comprises (i) encoding and storing, into at least a first of the multiple selected items of multimedia data, one or more values, and (ii) encoding and storing, into at least a second of the multiple selected items of multimedia data, authentication data in a manner indicated by the one or more values stored in the at least a first of the multiple selected items of multimedia data;
present, through a user interface associated with said computing device, a collection of multimedia data stored on said computing device in connection with an authentication request to access a protected resource associated with said computing device, wherein said collection of multimedia data includes (i) the respective ones of the multiple selected items of multimedia data within which the respective ones of the multiple sub-components of the item of cryptographic information are protected and (ii) one or more additional items of multimedia data encoded with authentication data recognized by the computing device as log-in credentials to an account associated with an attempted attack on the computing device;
extract each of the respective ones of the multiple sub-components of the item of cryptographic information protected within the respective ones of the multiple selected items of multimedia data, upon user identification of the respective ones of the multiple selected items of multimedia data, in the user-determined ordered sequence, to grant access to the protected resource associated with said computing device; and
perform the one or more cryptographic actions using the protected resource.

21. A method comprising steps of:
querying a user to select multiple items of multimedia data stored on a computing device to be used in connection with one or more cryptographic actions associated with said computing device, wherein said computing device comprises a mobile device;
deriving respective ones of multiple sub-components of an item of cryptographic information from within respective ones of the multiple selected items of multimedia data, wherein such that at least one of the multiple sub-components of the item of cryptographic information is derived from within each of the multiple selected items of multimedia data, and wherein said deriving comprises (i) extracting one or more portions of data, from each of the multiple selected items of multimedia data, associated with noise, and (ii) creating the corresponding respective sub-component of the item of cryptographic information from the extracted portions of data, wherein the corresponding respective sub-component of the item of cryptographic information comprises at least a pre-determined level of entropy;
presenting, through a user interface associated with said computing device, a collection of multimedia data stored on said computing device in connection with an authentication request to access a protected resource associated with said computing device, wherein said collection of multimedia data includes (i) the respective ones of the multiple selected items of multimedia data within which the respective ones of the multiple sub-components of the item of cryptographic information are derived and (ii) one or more additional items of multimedia data encoded with authentication data recognized by the computing device as log-in credentials to an account associated with an attempted attack on the computing device;
extracting each of the respective ones of the multiple sub-components of the item of cryptographic information derived from the respective ones of the multiple selected items of multimedia data, upon user identification of the respective ones of the multiple selected items of multimedia data, to grant access to the protected resource associated with said computing device; and
performing the one or more cryptographic actions using the protected resource;
wherein said steps are carried out by at least one computer device.

22. A method comprising steps of:
querying for selection, in a user-determined ordered sequence, of a first set multiple items of multimedia data stored on a computing device to be used in connection with one or more cryptographic actions associated with said computing device, wherein said computing device comprises a mobile device;
protecting respective ones of multiple sub-components of an item of cryptographic information within respective ones of the multiple selected items of multimedia data in the first set such that each of the multiple selected items of multimedia data in the first set protects at least one of the multiple sub-components of the item of cryptographic information, and wherein said protecting comprises (i) encoding and storing, into at least a first of the multiple selected items of multimedia data in the first set, one or more values, and (ii) encoding and storing, into at least a second of the multiple selected items of multimedia data in the first set, authentication data in a manner indicated by the one or more values stored in the at least a first of the multiple selected items of multimedia data in the first set;
presenting, through a user interface associated with said computing device, a collection of multimedia data stored on said computing device in connection with an authentication request to access a protected resource associated with said computing device, wherein said collection of multimedia data includes (i) the respective ones of the multiple selected items of multimedia data in the first set within which the respective ones of the multiple sub-components of the item of cryptographic information are protected and (ii) one or more additional items of multimedia data encoded with authentication data recognized by the computing device as log-in credentials to an account associated with an attempted attack on the computing device;

extracting each of the respective ones of the multiple sub-components of the item of cryptographic information protected within the respective ones of the multiple selected items of multimedia data in the first set, upon identification of the respective ones of the multiple selected items of multimedia data in the first set, in the user-determined ordered sequence, via the user, to grant access to the protected resource associated with said computing device;

performing the one or more cryptographic actions using the protected resource associated with said computing device;

removing, subsequent to said performing the one or more cryptographic actions, the respective ones of the multiple sub-components of the item of cryptographic information from within the respective ones of the multiple selected items of multimedia data in the first set;

querying for selection, subsequent to said removing, of a second set of multiple items of multimedia data stored on said computing device to be used in connection with the one or more cryptographic actions associated with said computing device; and protecting respective ones of multiple sub-components of the item of cryptographic information within respective ones of the multiple selected items of multimedia data in the second set such that each of the multiple selected items of multimedia data in the second set protects at least one of the multiple sub-components of the item of cryptographic information, and wherein said protecting comprises (i) encoding and storing, into at least a first of the multiple selected items of multimedia data in the second set, one or more values, and pi) encoding and storing, into at least a second of the multiple selected items of multimedia data in the second set, authentication data in a manner indicated by the one or more values stored in the at least a first of the multiple selected items of multimedia data in the second set;

wherein said steps are carried out by at least one computer device.

23. The method of claim 22, further comprising:

incorporating a geographic location parameter associated with said computing device as an authentication parameter to grant access to the protected resource.

24. The method of claim 22, further comprising:

querying the user to identify a particular portion of each of the respective ones of the multiple selected items of multimedia data in the first set within which the respective ones of the multiple sub-components of the item of cryptographic information are to be protected; and extracting each of the respective ones of the multiple sub-components of the item of cryptographic information protected within the respective ones of the multiple selected items of multimedia data in the first set, upon identification of the respective ones of the multiple selected items of multimedia data in the first set and each corresponding particular portion of the respective ones of the multiple selected items of multimedia data in the first set via the user, to grant access to the protected resource associated with said computing device.

* * * * *